April 22, 1924.	1,491,665
H. BOGATY
APPARATUS FOR DRYING PIECE GOODS
Filed Jan. 29, 1923    2 Sheets-Sheet 1
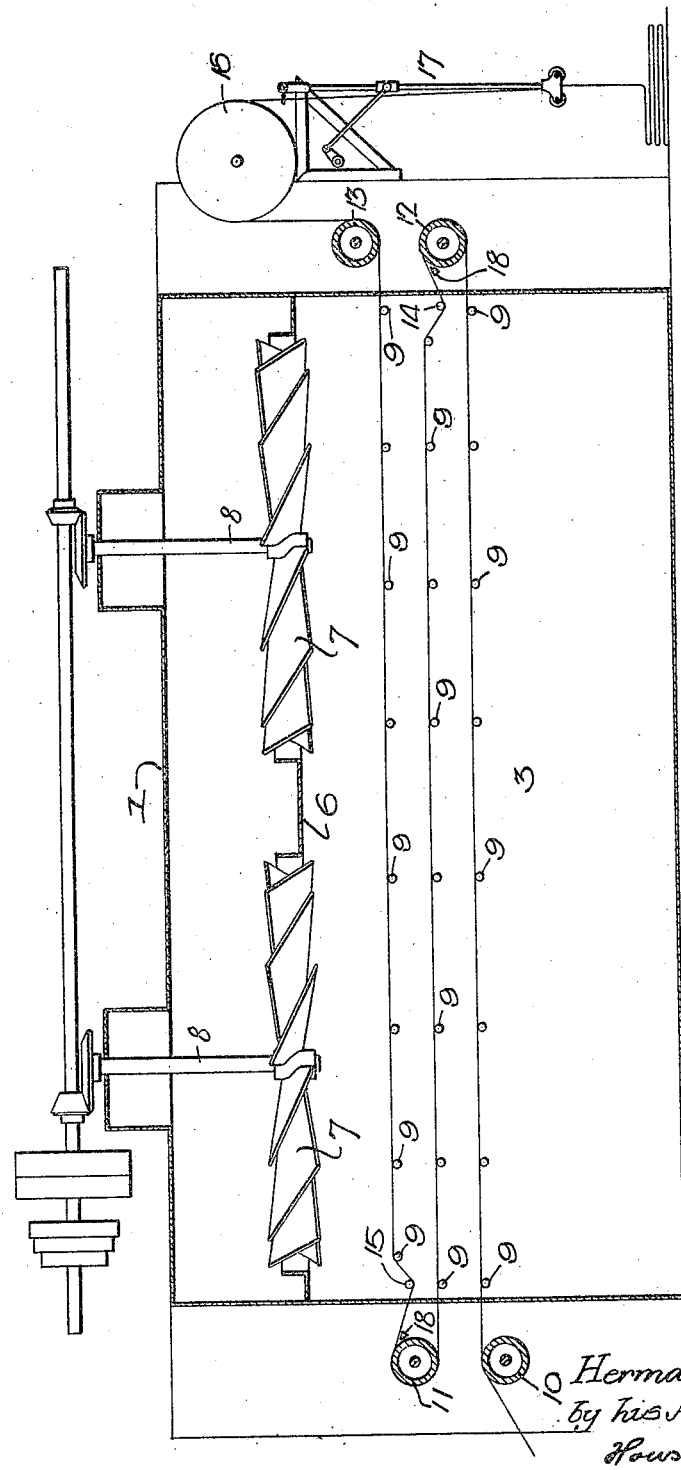

April 22, 1924.
H. BOGATY
1,491,665
APPARATUS FOR DRYING PIECE GOODS
Filed Jan. 29, 1923  2 Sheets-Sheet 2
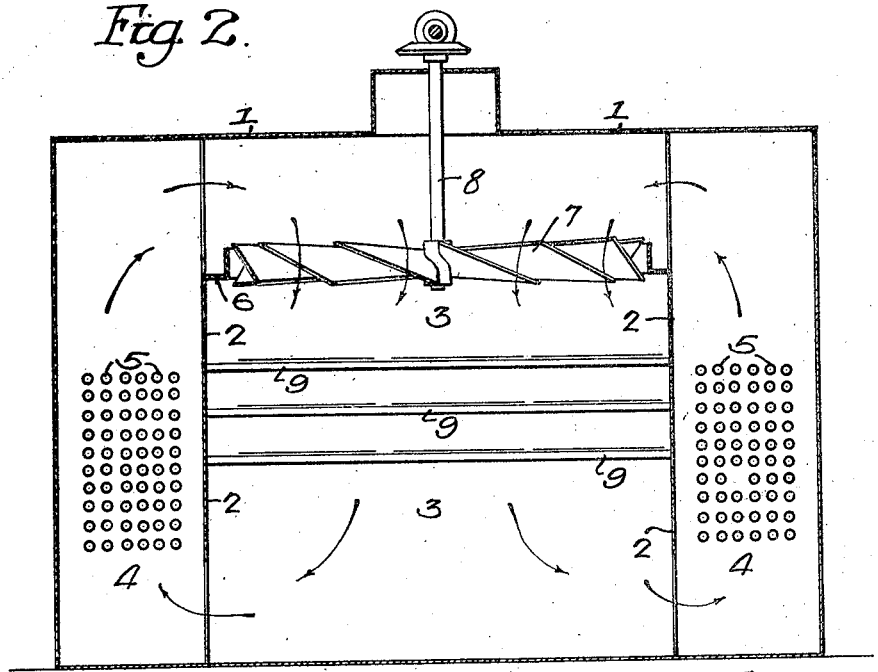
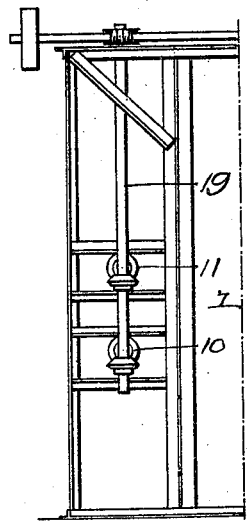
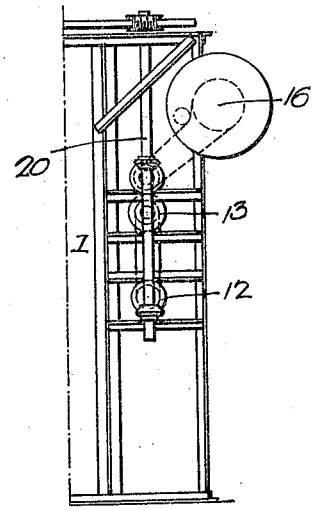
Inventor—
Hermann Bogaty.
by his Attorneys.
Howson & Howson Patented Apr. 22, 1924.

1,491,665

UNITED STATES PATENT OFFICE.

HERMANN BOGATY, OF PHILADELPHIA, PENNSYLVANIA, ASSIGNOR TO PROCTOR & SCHWARTZ, INC., OF PHILADELPHIA, PENNSYLVANIA, A CORPORATION OF PENNSYLVANIA.

APPARATUS FOR DRYING PIECE GOODS.

Application filed January 29, 1923. Serial No. 615,576.

*To all whom it may concern:*

Be it known that I, HERMANN BOGATY, a citizen of the United States, residing in Philadelphia, Pennsylvania, have invented certain Improvements in Apparatus for Drying Piece Goods, of which the following is a specification.

My invention relates to certain improvements in apparatus for drying cloth and silk piece goods.

One object of the invention is to construct the apparatus so that the material will travel therethrough in two, or more, horizontal paths, the last path being nearest to the circulating fans.

A further object of the invention is to prevent creases forming in the material while it is being dried and also to prevent stretching of the material.

These objects I attain in the following manner, reference being had to the accompanying drawings, in which:

Fig. 1 is a longitudinal sectional view through my improved drying apparatus;

Fig. 2 is a transverse sectional view;

Fig. 3 is a side view at the feed end of the machine; and

Fig. 4 is a side view at the delivery end of the machine.

Referring to the drawings, 1 is the casing of the drier having two longitudinal partitions 2 dividing the apparatus into a central drying chamber 3 and side heating chambers 4, in which are steam coils 5 of any suitable design. Openings are formed in the upper and lower portions of the partitions through which the air circulates. In the upper portion of the drying chamber is a horizontal partition 6, in which are openings for the circulating fans 7, mounted on vertical shafts 8, and driven in the manner shown in Fig. 1. In the drying chamber is a series of transverse, tubular supports 9, preferably made of brass. These supports are placed a sufficient distance apart to carry the material properly. In Fig. 1, three series of supports are shown.

At the feed end of the apparatus are driven rollers 10 and 11, and at the delivery end are driven rollers 12 and 13. The material passes over the roller 10 and into the apparatus, being carried by the lower supports 9. The material then passes around the roller 12, back into the apparatus, and under a tension roller 14, and over the second intermediate support 9 out of the apparatus and around the roller 11, returning under a tension roller 15 over the upper support 9 to the delivery roller 13, around the drum 16 to a standard folding device 17.

At the rollers 12 and 11 are doctors 18, which prevent the material being wrapped around the rollers. These doctors are bars, preferably triangular in cross section, as shown. The rollers 10 and 11 are driven from a vertical shaft 19. The rollers 12 and 13 are driven from a vertical shaft 20, which also drives the drum.

By the construction hereinbefore described, the material enters the drying chamber at the lowest point and travels horizontally first in one direction and then in the opposite direction, and upwards towards the fans. The air passes first through the driest portion of the material.

The doctors prevent the material accidentally wrapping around the rollers and the tension rollers 14 and 15 tend to keep the material flat and free of wrinkles. As the material is constantly in motion, there are no stick marks and, as all of the rollers are driven, the material is not under excessive tension.

The invention is particularly adapted for drying silk piece goods, which must be handled with the utmost care.

I claim:

1. The combination in a drying apparatus, of a casing having a drying chamber; a series of transverse supporting bars for the material being dried; driven rollers at each end of the drier, outside of the drying chamber, over which the material is passed; overhead circulating means for circulating heated air in the drying chamber; and means for heating the air.

2. The combination in a drying apparatus, of a casing having a drying chamber therein; circulating fans in the upper portion of the chamber; transverse supporting bars for the material, said bars being arranged in series, one series above the other; and driven rollers at each end of the drier, the casing having a feed opening in line with the lower series of supporting bars and a discharge opening in line with the upper series of bars so that the material passing through the drier will be subjected to the direct action of the heated air in circulation as it leaves the drier.

3. The combination in a drying apparatus, of a casing having a drying chamber therein; means for circulating heated air in the chamber; a series of supporting bars in the chamber for the material being dried; driven rollers at each end of the drier; a tension rod near each intermediate roller; and doctors at said rollers.

HERMANN BOGATY.